United States Patent
Cho et al.

(10) Patent No.: US 11,563,211 B2
(45) Date of Patent: *Jan. 24, 2023

(54) POSITIVE ELECTRODE ACTIVE MATERIAL, METHOD OF PREPARING THE SAME, AND LITHIUM SECONDARY BATTERY INCLUDING THE SAME

(71) Applicant: LG Chem, Ltd., Seoul (KR)

(72) Inventors: Moon Kyu Cho, Daejeon (KR); Dong Joon Ahn, Daejeon (KR); Sung Soon Park, Daejeon (KR)

(73) Assignee: LG Chem, Ltd.

( * ) Notice: Subject to any disclaimer, the term of this patent is extended or adjusted under 35 U.S.C. 154(b) by 25 days.

This patent is subject to a terminal disclaimer.

(21) Appl. No.: 16/611,264

(22) PCT Filed: Oct. 11, 2018

(86) PCT No.: PCT/KR2018/011990
§ 371 (c)(1),
(2) Date: Nov. 6, 2019

(87) PCT Pub. No.: WO2019/074306
PCT Pub. Date: Apr. 18, 2019

(65) Prior Publication Data
US 2020/0075947 A1 Mar. 5, 2020

(30) Foreign Application Priority Data
Oct. 11, 2017 (KR) .................. 10-2017-0131335

(51) Int. Cl.
| | | |
|---|---|---|
| *H01M 4/505* | (2010.01) | |
| *C01G 53/00* | (2006.01) | |
| *H01M 4/525* | (2010.01) | |
| *H01M 10/0525* | (2010.01) | |
| *H01M 4/02* | (2006.01) | |

(52) U.S. Cl.
CPC ............ *H01M 4/505* (2013.01); *C01G 53/50* (2013.01); *H01M 4/525* (2013.01); *H01M 10/0525* (2013.01); *C01P 2002/52* (2013.01); *C01P 2004/51* (2013.01); *C01P 2004/61* (2013.01); *C01P 2006/40* (2013.01); *H01M 2004/028* (2013.01)

(58) Field of Classification Search
CPC .............. H01M 4/505; H01M 4/525; H01M 10/0525; H01M 2004/028; H01M 4/485; H01M 10/052; C01G 53/50; C01G 53/44; C01P 2002/52; C01P 2004/51; C01P 2004/61; C01P 2006/40; C01P 2006/37; Y02E 60/10
See application file for complete search history.

(56) References Cited

U.S. PATENT DOCUMENTS

| | | | |
|---|---|---|---|
| 2002/0192552 A1 | 12/2002 | Lampe-Onnerud et al. | |
| 2002/0192556 A1* | 12/2002 | Lampe-Onnerud ... | H01M 4/131 429/231.95 |
| 2003/0211235 A1 | 11/2003 | Suh et al. | |
| 2009/0263707 A1* | 10/2009 | Buckley ............... | H01M 4/505 429/94 |
| 2011/0287319 A1 | 11/2011 | Vogler et al. | |
| 2012/0040247 A1 | 2/2012 | Manivannan et al. | |
| 2012/0263987 A1 | 10/2012 | Buckley et al. | |
| 2013/0101900 A1 | 4/2013 | Nagai | |
| 2014/0322609 A1 | 10/2014 | Choi et al. | |
| 2016/0006026 A1 | 1/2016 | Paulsen et al. | |
| 2018/0175367 A1 | 6/2018 | Marusczyk et al. | |
| 2018/0241040 A1 | 8/2018 | You et al. | |

FOREIGN PATENT DOCUMENTS

| | | |
|---|---|---|
| CN | 1458705 A | 11/2003 |
| CN | 102388490 A | 3/2012 |
| CN | 106299328 A | 1/2017 |
| CN | 106395920 A * | 2/2017 |
| CN | 106395920 A | 2/2017 |
| JP | H11339805 A | 12/1999 |
| JP | 2001106528 A | 4/2001 |
| JP | 2003331845 A | 11/2003 |
| JP | 2004531034 A | 10/2004 |
| JP | 2004533104 A | 10/2004 |
| JP | 2011525470 A | 9/2011 |
| JP | 2014111533 A | 6/2014 |
| JP | 2017081819 A | 5/2017 |
| KR | 20050083869 A | 8/2005 |
| KR | 101321192 B1 | 10/2013 |
| KR | 20140016730 A | 2/2014 |
| KR | 20160135213 A | 11/2016 |

(Continued)

OTHER PUBLICATIONS

English Translation of CN106395920A (Year: 2017).*
Schipper, et al., Stabilizing nickel-rich layered cathode materials by a high-charge cation doping strategy: zirconium-doped LiNi0.6Co0.2Mn0.2O2, Journal of Materials Chemistry A, Sep. 2016, pp. 16073-16084, vol. 4, The Royal Society of Chemistry.
ISR for PCT/KR2018/011990 dated Mar. 13, 2019.
Search Report dated Dec. 31, 2021 from the Office Action for Chinese Application No. 201880009422.1 issued Jan. 11, 2022, 2 Pages.

*Primary Examiner* — Andrew J. Oyer
(74) *Attorney, Agent, or Firm* — Lerner, David, Littenberg, Krumholz & Mentlik, LLP

(57) ABSTRACT

The present invention relates to a positive electrode active material, wherein the positive electrode active material is a lithium transition metal oxide including a first doping element (A) and a second doping element (B), wherein the first doping element is one or more selected from the group consisting of Zr, La, Ce, Nb, Gd, Y, Sc, Ge, Ba, Sn, Sr, Cr, Mg, Sb, Bi, Zn, and Yb,
the second doping element is one or more selected from the group consisting of Al, Ta, Mn, Se, Be, As, Mo, V, W, Si, and Co, and a weight ratio (A/B ratio) of the first doping element to the second doping element is 0.5 to 5.

11 Claims, No Drawings

(56) References Cited

FOREIGN PATENT DOCUMENTS

| KR | 20170046921 A | 5/2017 |
|----|---------------|--------|
| WO | 2013081291 A1 | 6/2013 |
| WO | 2017002057 A1 | 1/2017 |
| WO | 2017111479 A1 | 6/2017 |

* cited by examiner

POSITIVE ELECTRODE ACTIVE MATERIAL, METHOD OF PREPARING THE SAME, AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/011990, filed Oct. 11, 2018, which claims priority from Korean Patent Application No. 10-2017-0131335, filed Oct. 11, 2017, the disclosures of which are incorporated herein by reference in their entirety.

The present invention relates to a positive electrode active material, a method of preparing the same, and a lithium secondary battery including the same.

BACKGROUND ART

As technological development of and demand for mobile devices increase, the demand for secondary batteries as energy sources thereof is rapidly increasing. Among these secondary batteries, lithium secondary batteries having high energy density and voltage, long cycle lifespan, and a low self-discharge rate are commercially available and widely used.

Lithium transition metal composite oxides are used as positive electrode active materials for lithium secondary batteries. Thereamong, a lithium cobalt composite metal oxide, $LiCoO_2$, having a high action voltage and superior capacity characteristics is mainly used. However, $LiCoO_2$ exhibits very poor thermal properties due to destabilization of a crystal structure caused by delithiation. In addition, since $LiCoO_2$ is expensive, it has a limitation in mass use as a power source in fields such as electric automobiles.

As substitutes for $LiCoO_2$, a lithium manganese composite metal oxide ($LiMnO_2$, $LiMn_2O_4$, etc.), a lithium iron phosphate compound ($LiFePO_4$, etc.), a lithium nickel composite metal oxide ($LiNiO_2$, etc.), and the like have been developed. Thereamong, research and development of a lithium nickel composite metal oxide capable of facilitating the implementation of a high-capacity battery due to a high reversible capacity of about 200 mAh/g is actively underway. However, $LiNiO_2$ exhibits poor thermal stability compared to $LiCoO_2$. In addition, a positive electrode active material including $LiNiO_2$ is decomposed upon the occurrence of internal short circuit due to external pressure and the like during charging, which may cause rupture and ignition of a battery.

To improve low thermal stability while maintaining excellent reversible capacity of $LiNiO_2$, a method of replacing a part of nickel (Ni) with cobalt (Co) or manganese (Mn) has been proposed. However, $LiNi_{1-x}Co_xO_2$ (x=0.1~0.3), wherein a part of nickel is replaced with cobalt, exhibits excellent charge/discharge characteristics and lifespan characteristics but low thermal stability. A nickel-manganese-based lithium composite metal oxide, wherein a part of Ni is replaced with Mn having excellent thermal stability, and a nickel-cobalt-manganese-based lithium composite metal oxide (hereinafter simply referred to as "NCM-based lithium oxide"), wherein a part of Ni is replaced with Mn and Co, exhibit low output characteristics and deterioration of battery characteristics due to elution of metal elements.

To address these problems, research on tuning the sintering temperature and thermal hysteresis curve of a positive electrode active material, a ratio of a precursor to a lithium source, and the morphology of the positive electrode active material and partially doping a transition metal site is underway.

DISCLOSURE OF THE INVENTION

Technical Problem

An aspect of the present invention provides a positive electrode active material for secondary batteries capable of exhibiting high capacity, long lifespan, superior thermal stability, and minimized performance deterioration under high voltage and continuously exhibiting the effect of a doping element by inhibiting elution of the doping element when applied to a lithium secondary battery.

Another aspect of the present invention provides a method of preparing the positive electrode active material.

Another aspect of the present invention provides a method of preparing a positive electrode active material for secondary batteries.

Technical Solution

According to an aspect of the present invention, there is provided a positive electrode active material, wherein the positive electrode active material is a lithium transition metal oxide including a first doping element (A) and a second doping element (B), wherein the first doping element is one or more selected from the group consisting of Zr, La, Ce, Nb, Gd, Y, Sc, Ge, Ba, Sn, Sr, Cr, Mg, Sb, Bi, Zn, and Yb, the second doping element is one or more selected from the group consisting of Al, Ta, Mn, Se, Be, As, Mo, V, W, Si, and Co, and a weight ratio (A/B ratio) of the first doping element to the second doping element is 0.5 to 5.

According to another aspect of the present invention, there is provided a method of preparing the positive electrode active material, the method including a step of mixing a lithium compound, a transition metal compound, a compound including a first doping element (A), and a compound including a second doping element (B); and a step of sintering a mixture obtained by the step.

According to another aspect of the present invention, there is provided a positive electrode and lithium secondary battery including the positive electrode active material.

Advantageous Effects

Since each of a lithium layer and transition metal layer constituting a positive electrode active material according to the present invention includes a doping element in a predetermined ratio, a secondary battery to which the positive electrode active material is applied can exhibit minimized performance deterioration under high voltage and, accordingly, excellent output characteristics.

BEST MODE FOR CARRYING OUT THE INVENTION

Now, the present invention will be described in more detail to help understand the present invention.

Terms or words used in the specification and the following claims shall not be limited to common or dictionary meanings, and have meanings and concepts corresponding to technical aspects of the embodiments of the present invention so as to most suitably express the embodiments of the present invention.

A positive electrode active material according to the present invention is a lithium transition metal oxide including a first doping element (A) and a second doping element (B), wherein the first doping element is one or more selected from the group consisting of Zr, La, Ce, Nb, Gd, Y, Sc, Ge, Ba, Sn, Sr, Cr, Mg, Sb, Bi, Zn, and Yb, the second doping element is one or more selected from the group consisting of Al, Ta, Mn, Se, Be, As, Mo, V, W, Si, and Co, and a weight ratio (A/B ratio) of the first doping element to the second doping element is 0.5 to 5.

The lithium transition metal oxide may be composed of a lithium layer and a transition metal layer. The lithium layer and the transition metal layer may include different doping elements. In particular, in the positive electrode active material according to an embodiment of the present invention, the first doping element may be included in the lithium layer, and the second doping element may be included in the transition metal layer.

The first doping element may be included in the lithium layer. Here, the first doping element may be located at a lithium ion site within a slab space in the lithium layer, i.e., an interslab space. The first doping element located within the slab space in the lithium layer helps to maintain the structure of the lithium layer. In addition, since the binding force (first dopant-oxygen bonding energy) between the first doping element and an oxygen layer is stronger than the binding force (lithium-oxygen bonding energy) between lithium and an oxygen layer, desorption of oxygen may be more easily prevented. Accordingly, local collapse of the interslab space of the lithium layer may be prevented and thus diffusion of lithium ions may be improved, whereby thermal characteristics and cycle characteristics of the lithium transition metal oxide may be improved.

The first doping element may be one or more selected from the group consisting of Zr, La, Ce, Nb, Gd, Y, Sc, Ge, Ba, Sn, Sr, Cr, Mg, Sb, Bi, Zn, and Yb particularly one or more selected from the group consisting of Zr, Y, Nb, Ce, and Mg. Cations of the first doping element may have an ionic radius similar to that of lithium ions, whereby the first doping element may be diffused into the lithium layer of the lithium transition metal oxide and located at the lithium ion site.

In the positive electrode active material according to an embodiment of the present invention, the first doping element is mostly included in the lithium layer but may be partially included in the transition metal layer in addition to the lithium layer. For example, the first doping element may be included in the lithium layer and the transition metal layer in a weight ratio of 80:20 to 100:0, particularly a weight ratio of 90:10 to 100:0, more particularly a weight ratio of 95:5 to 100:0.

A weight ratio of the first doping element located in the lithium layer to the first doping element located in the transition metal layer may be determined by a diffusion rate and an effective ion radius when the first doping element is doped into the lithium transition metal oxide upon preparation of the positive electrode active material of the present invention.

In addition, the second doping element may be included in the transition metal layer. The second doping element may be located at a transition metal ion site of a slab space within a transition metal. The second doping element located at a slab space within a transition metal layer may stabilize a layered structure of the transition metal layer. In addition, since the binding force (second dopant-oxygen bonding energy) between the second doping element and an oxygen layer is stronger than the binding force (transition metal-oxygen bonding energy) between the transition metal and an oxygen layer, desorption of oxygen may be prevented more easily. Accordingly, thermal characteristics and cycle characteristics may be further improved.

In the positive electrode active material according to an embodiment of the present invention, the second doping element may be mostly included in the transition metal layer but may be partially included in the lithium layer in addition to the transition metal layer. For example, the second doping element may be included in the transition metal layer and the lithium layer in a weight ratio of 80:20 to 100:0, particularly a weight ratio of 90:10 to 100:0, more particularly a weight ratio of 95:5 to 100:0.

A weight ratio of the second doping element located in the lithium layer to the second doping element located in the transition metal layer may be determined by a diffusion rate and an effective ion radius when the second doping element is doped into the lithium transition metal oxide upon preparation of the positive electrode active material of the present invention.

A weight ratio (A/B ratio) of the first doping element to the second doping element may be 0.5 to 5, particularly 0.5 to 4, more particularly 0.5 to 3.

When a ratio of the first doping element to the second doping element (A/B ratio), i.e., a value obtained by dividing the content of the first doping element included in the positive electrode active material by the content of the second doping element, is within the ranges, a ratio of the amount of the first doping element included in the lithium layer of the lithium transition metal oxide to the amount of the second doping element included in the transition metal layer is appropriate. Accordingly, the doping elements may prevent local collapse of the layered structure, thereby stabilizing the layered structure of the lithium transition metal oxide and improving diffusion of lithium ions. When a ratio of the first doping element to the second doping element (A/B ratio) is less than 0.5, a ratio of the first doping element included in the lithium layer is low, whereby stabilization effect of the layered structure and ion diffusion improvement effect may be insufficient. When a ratio of the first doping element to the second doping element (A/B ratio) is greater than 5, a ratio of the second doping element included in the transition metal layer is low, whereby stabilization of the layered structure of the lithium transition metal oxide may be insufficient.

In the positive electrode active material according to an embodiment of the present invention, the lithium transition metal oxide is composed of a lithium layer and a transition metal layer. A weight ratio of a dopant included in the lithium layer to a dopant included in the transition metal layer may be 0.5 to 5, particularly 0.5 to 4, more particularly 0.5 to 3.

When a weight ratio of the dopant included in the lithium layer to the dopant included in the transition metal layer is within the range, the layered structure of the lithium transition metal oxide may be appropriately stabilized and ion diffusion thereof may be appropriately improved.

Based on a total weight of the positive electrode active material according to an embodiment of the present invention, the first doping element may be included in an amount of 100 ppm to 10,000 ppm, particularly 200 ppm to 8,000 ppm, more particularly 1,500 ppm to 6,000 ppm. The content of the first doping element may be appropriately determined within the ranges depending upon an element type. When the first doping element is included within the ranges, the layered structure of the lithium layer may be stabilized, and diffusion of lithium ions may be improved, as described above.

In addition, the second doping element may be included in an amount of 100 ppm to 10,000 ppm, particularly 200 ppm to 5,000 ppm, more particularly 500 ppm to 3,000 ppm, based on a total weight of the positive electrode active material according to an embodiment of the present invention. The content of the second doping element may be appropriately determined within the ranges depending upon an element type. When the second doping element is included within the ranges, the layered structure of the transition metal layer may be stabilized as described above.

In the positive electrode active material according to an embodiment of the present invention, the lithium transition metal oxide may be, for example, one or more selected from the group consisting of lithium-cobalt oxides, lithium-manganese oxides, lithium-nickel-manganese oxides, lithium-manganese-cobalt oxides, and lithium-nickel-manganese-cobalt oxides, particularly $LiCoO_2$; $LiNiO_2$; $LiMnO_2$; $LiMn_2O_4$; $Li(Ni_cCo_dMn_e)O_2$ ($0<c<1$, $0<d<1$, $0<e<1$, and $c+d+e=1$); $LiNi_{1-f}Co_fO_2$, $LiCo_{1-f}Mn_fO$, and $LiNi_{1-f}Mn_fO_2$ ($0<f<1$); $Li(Ni_gCo_hMn_i)O_4$ ($0<g<2$, $0<h<2$, $0<i<2$, and $g+h+i=2$); and $LiMn_{2-j}Ni_jO_4$ and $LiMn_{2-j}Co_jO_4$ ($0<j<2$), but the present invention is not limited thereto.

Meanwhile, the positive electrode active material according to an embodiment of the present invention may be represented by Formula 1 below;

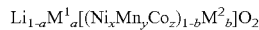   [Formula 1]

wherein $0<a<0.1$, $0<b<0.1$, $x+y+z=1$, $M^1$ is one or more selected from the group consisting of Zr, La, Ce, Nb, Gd, Y, Sc, Ge, Ba, Sn, Sr, Cr, Mg, Sb, Bi, Zn, and Yb, and $M^2$ is one or more selected from the group consisting of Al, Ta, Mn, Se, Be, As, Mo, V, W, Si, and Co.

In Formula 1, $0≤x≤1$, $0≤y≤1$, $0≤z≤1$, and at least one of x, y, and z is not 0.

In addition, the positive electrode active material according to an embodiment of the present invention may be represented by Formula 2 below:

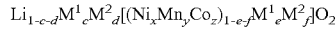   [Formula 2]

wherein $0<c<0.1$, $0<d<0.1$, $0<e<0.1$, $0<f<0.1$, $x+y+z=1$, $M^1$ is one or more selected from the group consisting of Zr, La, Ce, Nb, Gd, Y, Sc, Ge, Ba, Sn, Sr, Cr, Mg, Sb, Bi, Zn, and Yb, and $M^2$ is one or more selected from the group consisting of Al, Ta, Mn, Se, Be, As, Mo, V, W, Si, and Co.

In Formula 2, $0≤x≤1$, $0≤y≤1$, $0≤z≤1$, and at least one of x, y, and z is not 0.

In addition, in Formula 2, c>e and f>d.

The present invention provides a method of preparing the positive electrode active material.

The positive electrode active material according to an embodiment of the present invention may be prepared by a method including a step of mixing a lithium compound, a transition metal compound, a compound including a first doping element (A), and a compound including a second doping element (B) and a step of sintering the resultant mixture.

In the method of preparing the positive electrode active material according to an embodiment of the present invention, a step of mixing a lithium compound, a transition metal compound, a compound including a first doping element (A), and a compound including a second doping element (B) is first performed.

As the lithium compound and the transition metal compound, a lithium compound and a transition metal compound generally used to prepare a positive electrode active material in the art may be used.

Lithium-containing sulfate, nitrate, acetate, carbonate, oxalate, citrate, halide, hydroxide, oxyhydroxide, or the like may be used as the lithium compound, but the present invention is not specifically limited thereto. Particularly, the lithium compound may be $Li_2CO_3$, $LiNO_3$, $LiNO_2$, $LiOH$, $LiOH.H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, or the like. These substances may be used alone or as a mixture of two or more thereof.

As the transition metal compound, one or more selected from the group consisting of oxides, hydroxides, nitrates, chlorides, and carbonates of transition metals may be used, but the present invention is not limited thereto.

The compound including the first doping element (A) may be an oxide, hydroxide, nitrate, chloride, or carbonate of the first doping element (A), particularly an oxide or hydroxide of the first doping element. When an oxide or hydroxide of the first doping element is used as the compound including the first doping element, cations of the first doping element is diffused and included in the lithium layer and oxygen ions and hydroxide ions paired with cations of the first doping element are desorbed in the form of $O_2(g)$, $CO(g)$, $CO_2(g)$, and $H_2O$ in a subsequent sintering process, whereby only cations are doped.

The compound including the second doping element (B) may be an oxide, hydroxide, nitrate, chloride, or carbonate of the second doping element (B), particularly an oxide or hydroxide of the second doping element. When an oxide or hydroxide of the second doping element (B) is used as the compound including the second doping element (B), cations of the second doping element (B) are diffused and included in the transition metal layer and oxygen ions and hydroxide ions paired with cations of the second doping element (B) are desorbed in the form of $O_2(g)$, $CO(g)$, $CO_2(g)$, and $H_2O$ in a subsequent sintering process, whereby only cations are doped.

When the first and second doping elements are metal elements, it is difficult to perform doping into a lithium layer and a transition metal layer due to large ionic radii of the metal elements. Accordingly, it is necessary to perform doping into a metal ion form. In addition, since an effective ion radius depends upon an oxidation number of a doping element when the doping element is used in an oxide or hydroxide form, it is possible to select a variety of sizes, thereby widening a selection range of a dopant for doping. Further, the cost may be greatly reduced compared to metal elements.

Next, a step of sintering the mixture is performed.

Through the sintering, a lithium transition metal oxide composed of a transition metal layer and a lithium layer may be formed.

During the sintering, the first doping element (A) may be included in the lithium layer, and the second doping element (B) may be included in the transition metal layer. Doping positions of the first doping element (A) and the second doping element (B) may be determined due to a diffusion rate difference therebetween during the sintering. In particular, during the sintering, the first doping element (A) may be located at the lithium layer of the lithium transition metal oxide, and the second doping element (B) may be located at the transition metal layer.

In the method of preparing the positive electrode active material according to an embodiment of the present invention, the first doping element may be mostly included in the lithium layer but may also be partially included in the transition metal layer in addition to the lithium layer during the sintering. For example, the first doping element may be included in the lithium layer and the transition metal layer in a weight ratio of 80:20 to 100:0, particularly a weight ratio of 90:10 to 100:0, more particularly a weight ratio of 95:5 to 100:0.

In addition, in the method of preparing the positive electrode active material according to an embodiment of the present invention, the second doping element may be mostly included in the transition metal layer but may also be partially included in the lithium layer in addition to the transition metal layer during the sintering. For example, the second doping element may be included in the transition metal layer and the lithium layer in a weight ratio of 80:20 to 100:0, particularly a weight ratio of 90:10 to 100:0, more particularly a weight ratio of 95:5 to 100:0.

The sintering may be performed at 600° C. to 1,150° C. particularly 800° C. to 1,100° C. for 5 hours to 20 hours particularly 6 hours to 14 hours.

When the sintering temperature is below the ranges, a discharge capacity per unit weight, cycle characteristics, and an operation voltage may be decreased due to a residual unreacted raw material. When the sintering temperature exceeds the ranges, a discharge capacity per unit weight, cycle characteristics, and an operation voltage may be decreased due to generation of side reactants. When the sintering temperature is within the ranges, the positive electrode active material may be appropriately prepared without the residue of unreacted raw materials and generation of side reactants.

The sintering may be performed under an oxidizing atmosphere, such as air or oxygen, or a reducing atmosphere containing nitrogen or hydrogen. Under such conditions, diffusion between particles is sufficiently accomplished through the sintering, and diffusion of metals occurs even in a portion where an internal metal concentration is constant. As a result, a metal oxide having a continuous metal concentration distribution from the center thereof to a surface thereof may be produced.

Meanwhile, presintering of maintaining 250° C. to 650° C. for 5 to 20 hours may be optionally performed before the sintering. In addition, an annealing process may be selectively performed at 600° C. to 800° C. for 2 to 10 hours after the sintering.

In the case of the positive electrode active material prepared by the method, the distribution of the transition metal is controlled throughout active material particles, whereby performance deterioration under high voltage may be minimized while exhibiting high capacity, long lifespan, and superior thermal stability when applied to a battery.

In accordance with another embodiment of the present invention, a positive electrode including the positive electrode active material is provided.

In particular, the positive electrode includes a positive electrode current collector and a positive electrode active material layer that is formed on the positive electrode current collector and includes the positive electrode active material.

The positive electrode current collector is not particularly limited so long as it does not cause chemical changes in a battery and has conductivity. For example, the positive electrode current collector may be made of stainless steel, aluminum, nickel, titanium, sintered carbon, or aluminum or stainless steel surface-treated with carbon, nickel, titanium, silver, or the like. In addition, the positive electrode current collector may be generally made to a thickness of 3 μm to 500 μm. The positive electrode current collector may have fine irregularities or whiskers formed by etching at a surface thereof to increase adhesion between the positive electrode active material and the positive electrode current collector. The positive electrode current collector may be used in various forms including films, sheets, foils, nets, porous structures, foams, and non-woven fabrics.

The positive electrode active material layer may include a conductive material and a binder in addition to the aforementioned positive electrode active material.

Here, the conductive material, which is used for imparting conductivity to an electrode, may be used without particular limitation as long as it has electron conductivity without causing chemical changes in a battery. As particular examples of the conductive material, there are graphite, such as natural or artificial graphite; carbon-based materials, such as carbon black, acetylene black, Ketjen black, channel black, furnace black, lamp black, thermal black, and conductive fiber; powders or fibers of metals, such as copper, nickel, aluminum, and silver; conductive whiskers, such as zinc oxide and potassium titanate; conductive metal oxides, such as titanium oxide; conductive polymers, such as polyphenylene derivatives; and the like. These materials may be used alone or as a mixture of two or more thereof. The conductive material may be included in an amount of 1 to 30% by weight based on a total weight of the positive electrode active material layer.

The binder serves to increase adhesion between positive electrode active material particles and adhesion force between the positive electrode active material and the current collector. As particular examples of the binder, there are polyvinylidene fluoride (PVdF), vinylidene fluoride-hexafluoropropylene copolymer (PVdF-co-HFP), polyvinyl alcohols, polyacrylonitrile, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber (SBR), fluorine rubber, various copolymers thereof, and the like. These materials may be used alone or as a mixture of two or more thereof. The binder may be included in an amount of 1% by weight to 30% by weight based on a total weight of the positive electrode active material layer.

The positive electrode may be manufactured according to a general positive electrode manufacturing method except for use of the positive electrode active material. In particular, the positive electrode may be manufactured by applying a composition for forming a positive electrode active material layer, which is prepared by mixing the positive electrode active material and, selectively, a binder and a conductive material with a solvent or dispersing therein, on a positive electrode current collector, and then drying and rolling the same. Here, the types and contents of the positive electrode active material, the binder, and the conductive material are the same as those described above.

The solvent may be a solvent generally used in the technical field to which the present invention pertains. The solvent may be dimethyl sulfoxide (DMSO), isopropyl alcohol, N-methylpyrrolidone (NMP), acetone, water, or the like. These substances may be used alone or a mixture of two or more thereof. The solvent may be used in a sufficient amount to realize a viscosity or a solid content allowing dissolving or dispersing of the positive electrode active material, the conductive material, and the binder and then exhibit excellent uniformity of thickness when the resultant solution is applied so as to manufacture a positive electrode considering a coating thickness of a slurry and a production yield.

As another method, the positive electrode may be manufactured by casting the composition for forming a positive electrode active material layer on a separate support and then laminating a film, peeled from the support, on a positive electrode current collector.

In accordance with another embodiment of the present invention, an electrochemical device including the positive electrode is provided. The electrochemical device may particularly be a battery, a capacitor, or the like, more particularly a lithium secondary battery.

The lithium secondary battery may include a positive electrode, a negative electrode disposed opposite to the positive electrode, a separator interposed between the positive electrode and the negative electrode, and an electrolyte. Here, the positive electrode has been described above. In addition, the lithium secondary battery may selectively, and additionally include a battery container for housing an electrode assembly constituted of the positive electrode, the negative electrode, and the separator and a sealing member for sealing the battery container.

In the lithium secondary battery, the negative electrode includes a negative electrode current collector and a negative electrode active material layer located on the negative electrode current collector.

The negative electrode current collector is not particularly limited so long as it does not cause chemical changes in a battery and has high conductivity. For example, the negative electrode current collector may be made of copper, stainless steel, aluminum, nickel, titanium, sintered carbon, or copper or stainless steel surface-treated with carbon, nickel, titanium, silver, aluminum-cadmium alloy, or the like. In addition, the negative electrode current collector may be generally made to a thickness of 3 μm to 500 μm. The negative electrode current collector may have fine irregularities or whiskers formed by etching at a surface thereof to increase binding force between the negative electrode active material and the negative electrode current collector, as in the positive electrode current collector. The negative electrode current collector may be used in various forms including films, sheets, foils, nets, porous structures, foams, and non-woven fabrics.

The negative electrode active material layer selectively includes a binder and a conductive material in addition to the negative electrode active material.

As the negative electrode active material, compounds allowing reversible intercalation and deintercalation of lithium may be used. As particular examples, there are carbonaceous materials such as artificial graphite, natural graphite, graphitized carbon fiber, and amorphous carbon; metallic compounds, such as Si, Al, Sn, Pb, Zn, Bi, In, Mg, Ga, Cd, Si alloys, Sn alloys, and Al alloys, capable of being alloyed with lithium; metal oxides, such as $SiO_x$ (0<x<2), $SnO_2$, vanadium oxide, and lithium vanadium oxide, which is capable of doping and dedoping lithium; composites, such as a Si—C composite and a Sn—C composite, including the metallic compound and the carbonaceous material; or the like. These substances may be used alone or as a mixture of two or more thereof. In addition, a metal lithium thin film may be used as the negative electrode active material. In addition, low-crystalline carbon, high-crystalline carbon, or the like may be used as the carbonaceous material. As representative examples of the low-crystalline carbon, there are soft carbon and hard carbon. As representative examples of high-crystalline carbon, there are amorphous, plate-like, scaly, spherical, or fiber-type natural or artificial graphite, Kish graphite, pyrolytic carbon, mesophase pitch based carbon fiber, meso-carbon microbeads, mesophase pitches and petroleum, high-temperature baked carbons such as coal tar pitch derived cokes, and the like.

In addition, the binder and the conductive material may be the same as those described with regard to the positive electrode.

The negative electrode active material layer may be manufactured, for example, by applying a composition for forming a negative electrode, which is prepared by dispersing a negative electrode active material, and selectively, a binder and a conductive material in a solvent, on a negative electrode current collector and drying the same, or casting the composition for forming a negative electrode on a separate support and then laminating a film peeled from the support on a negative electrode current collector.

Meanwhile, the separator of the lithium secondary battery is not specifically limited so long as it can separate a negative electrode from a positive electrode and provide a movement path of lithium ions and can be used in general lithium secondary batteries. In particular, the separator is preferred to have low resistance to ion movement of an electrolyte and an excellent ability to impregnate the electrolyte. Particularly, a porous polymer film, e.g., a porous polymer film made of a polyolefin-based polymer such as an ethylene homopolymer, a propylene homopolymer, an ethylene/butene copolymer, an ethylene/hexene copolymer, or an ethylene/hexene copolymer, or a laminated structure including two or more porous polymer films, may be used. General porous nonwoven fabrics, e.g., nonwoven fabrics made of high-melting-point glass fiber, polyethylene terephthalate fiber, or the like, may also be used. A coated separator containing a ceramic component or a polymer material may be used for securing heat resistance or mechanical strength. The coated separator may be selectively used as a single layer or a multilayered structure.

In addition, the electrolyte used in the present invention may be an organic liquid electrolyte, an inorganic liquid electrolyte, a solid polymer electrolyte, a gel-type polymer electrolyte, a solid inorganic electrolyte, a melt-type inorganic electrolyte, or the like, which is used for manufacturing a lithium secondary battery, but the present invention is not limited thereto.

In particular, the electrolyte may include an organic solvent and a lithium salt.

The organic solvent is not specifically limited so long as it functions as a medium through which ions involved in an electrochemical reaction of a battery can move. Particular examples of the organic solvent include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), and propylene carbonate (PC); alcohol-based solvents such as ethyl alcohol and isopropyl alcohol; nitriles such as R—CN (R is a straight, branched, or cyclic hydrocarbon group of C2 to C20 and may include a double-bond aromatic ring or an ether bond); amides such as dimethylformamide; dioxolanes such as 1,3-dioxolane; sulfolanes; and the like. Thereamong, the carbonate-based solvent is preferred, and a mixture of a cyclic carbonate (e.g., ethylenecarbonate, propylenecarbonate, etc.) with a high ionic conductivity and a high dielectric constant capable of increasing charge/discharge performance of a battery and a linear carbonate-based compound with low viscosity (e.g., ethyl methyl carbonate, dimethyl carbonate, diethyl carbonate, etc.) is further preferred. In this case, an electrolytic solution may exhibit excellent performance when a volume ratio of the cyclic carbonate to the chain-type carbonate is about 1:1 to about 1:9.

The lithium salt is not specifically limited so long as it can provide lithium ions used in a lithium secondary battery. Particularly, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, $LiB(C_2O_4)_2$, or the like may be used as the lithium salt. The concentration of the lithium salt is preferably 0.1 M to 2.0 M. When the concentration of lithium salt is within this range, the electrolyte may have appropriate conductivity and viscosity, thereby exhibiting excellent performance and efficient movement of lithium ions.

The electrolyte may further include one or more additives for improving lifespan characteristics of a battery, preventing capacity reduction of the battery, and improving a discharge capacity of the battery, such as a haloalkylene carbonate-based compound such as difluoroethylene carbonate, pyridine, triethylphosphite, triethanolamine, cyclic ether, ethylene diamine, n-glyme, hexamethyl phosphoric triamide, a nitrobenzene derivative, sulfur, a quinone imine dye, N-substituted oxazolidinone, N, N-substituted imidazolidine, ethylene glycol dialkyl ether, ammonium salt, pyrrole, 2-methoxy ethanol, or aluminum trichloride, in addition to the components of the electrolyte. Here, the additive may be included in an amount of 0.1% by weight to 5% by weight based on a total weight of the electrolyte.

Since the lithium secondary battery including the positive electrode active material according to the present invention stably exhibits excellent discharge capacity, output characteristics and capacity retention rate, it may be usefully utilized in portable devices such as mobile phones, notebook computers, and digital cameras, electric vehicles such as hybrid electric vehicles (HEV), and the like.

In accordance with another embodiment of the present invention, a battery module including the lithium secondary battery as a unit cell and a battery pack including the battery module are provided.

The battery module or the battery pack may be used as power of a medium to large device of one or more of power tools, electric vehicles (EV) including hybrid electric vehicles and plug-in hybrid electric vehicles (PHEV), and systems for power storage.

An external shape of the lithium secondary battery of the present invention is not specifically limited and may be a cylindrical shape such as a can, a square shape, a pouch shape, a coin shape, or the like.

The lithium secondary battery according to the present invention may be used in a battery cell that is used as power for a small device. In addition, the lithium secondary battery may be used as a unit cell for medium to large battery modules including a plurality of battery cells.

MODE FOR CARRYING OUT THE INVENTION

Hereinafter, exemplary embodiments of the present invention are described in detail for those of ordinary skill in the art to easily implement. However, the present invention may be implemented in various different forms and is not limited to these embodiments.

EXAMPLE 1

A transition metal precursor ($Ni_{0.6}Co_{0.2}Mn_{0.2}(OH)_2$) and a lithium salt ($Li_2CO_3$) were dry-mixed in a stoichiometric ratio of 1:1.06. The lithium used in a large amount was added in an amount of 10% or less in consideration of the uniformity of mixing with the precursor, the purity of the lithium salt itself, loss due to volatilization of the lithium salt at high temperature, and the like. The transition metal precursor and the lithium salt were mixed such that the amount of a positive electrode active material obtained after sintering was 200 g, using a Henschel mixer capable of applying shear force, due to different specific gravities and average particle sizes thereof. An addition amount of each doping element was determined by being converted into a ratio of the doping element to a total of doping compounds. For example, ($Zr(OH)_4$, 100 ppm) represented that the content of Zr, not $Zr(OH)_4$, was 100 ppm. Zirconium hydroxide ($Zr(OH)_4$, 2,000 ppm) and tantalum oxide ($Ta_2O_5$, 1,000 ppm) were added to the mixture of the transition metal precursor and the lithium salt compound, followed by sintering in a 800° C. furnace with a temperature control function for 12 hours. As a result, a positive electrode active material was prepared.

The obtained positive electrode active material was sintered according to melting of the lithium salt, and thus, a portion of the positive electrode active material was present in an agglomerated state. Accordingly, to prepare the positive electrode active material having particle distribution similar to that of the precursor, an average particle size of the positive electrode active material was adjusted by pulverization and classification processes.

The pulverization process was performed by means of a Henschel mixer. After the pulverization process, a classification process was performed using a mesh scale net equipped with an ultrasonic device. Finally, a positive electrode active material (Ni:Co:Mn=6:2:2 in a mole ratio) having an average particle size ($D_{50}$) of 11.5 μm was prepared.

EXAMPLE 2

A positive electrode active material powder (Ni:Co:Mn=6:2:2 in a mole ratio) doped with two elements was obtained in the same manner as in Example 1, except that the contents of zirconium hydroxide and tantalum oxide were 2,000 ppm and 2,000 ppm, respectively.

EXAMPLE 3

A positive electrode active material powder (Ni:Co:Mn=6:2:2 in a mole ratio) doped with two elements was obtained in the same manner as in Example 1, except that the contents of zirconium hydroxide and tantalum oxide were 2,000 ppm and 4,000 ppm, respectively.

EXAMPLE 4

A positive electrode active material powder (Ni:Co:Mn=6:2:2 in a mole ratio) doped with two elements was obtained in the same manner as in Example 1, except that zirconium oxide ($ZrO_2$, 2,000 ppm) and tantalum oxide (1,000 ppm) were used instead of zirconium hydroxide and tantalum oxide.

EXAMPLE 5

A positive electrode active material powder (Ni:Co:Mn=6:2:2 in a mole ratio) doped with two elements was obtained in the same manner as in Example 1, except that zirconium hydroxide ($Zr(OH)_4$, 2,000 ppm) and cobalt hydroxide (Co(OH)$_2$, 2,000 ppm) were used instead of zirconium hydroxide and tantalum oxide.

EXAMPLE 6

A positive electrode active material powder (Ni:Co:Mn=6:2:2 in a mole ratio) doped with two elements was obtained in the same manner as in Example 1, except that zirconium hydroxide (Zr(OH)$_4$, 2,000 ppm) and aluminum hydroxide (Al(OH)$_3$, 2,000 ppm) were used instead of zirconium hydroxide and tantalum oxide.

Comparative Example 1

A non-doped positive electrode active material powder (Ni:Co:Mn=6:2:2 in a mole ratio) was obtained in the same manner as in Example 1, except that zirconium hydroxide and tantalum oxide were not added.

Comparative Example 2

A positive electrode active material powder (Ni:Co:Mn=6:2:2 in a mole ratio) doped with only one element was obtained in the same manner as in Example 1, except that zirconium hydroxide (2,000 ppm) was only used instead of zirconium hydroxide and tantalum oxide.

Comparative Example 3

A positive electrode active material powder (Ni:Co:Mn=6:2:2 in a mole ratio) doped with only one element was obtained in the same manner as in Example 1, except that only aluminum hydroxide (Al(OH)$_3$ 2,000 ppm) was used instead of zirconium hydroxide and tantalum oxide.

Comparative Example 4

A positive electrode active material powder (Ni:Co:Mn=6:2:2 in a mole ratio) doped with two elements was obtained in the same manner as in Example 1, except that zirconium hydroxide and tantalum oxide were respectively used in amounts of 2,000 ppm and 350 ppm.

Comparative Example 5

A positive electrode active material powder (Ni:Co:Mn=6:2:2 in a mole ratio) doped with two elements was obtained in the same manner as in Example 1, except that zirconium hydroxide and tantalum oxide were respectively used in amounts of 2,000 ppm and 4,500 ppm.

Experimental Example 1: Analysis of Components of Positive Electrode Active Material The positive electrode active materials prepared according to Examples 1 to 6 and Comparative Example 4 and 5 were subjected to rietveld refinement by XRD to investigate the content of a dopant distributed in the lithium layer and the transition metal layer of each thereof. Results are summarized in Table 1 below.

TABLE 1

| | Dopant type and content | | | | |
|---|---|---|---|---|---|
| | Lithium layer (content, % by weight) | | Transition metal layer (content, % by weight) | | Weight ratio of first doping element to second doping element |
| | First doping element | Second doping element | First doping element | Second doping element | |
| Example 1 | 99.5 | 1.2 | 0.5 | 98.8 | 2 |
| Example 2 | 99.4 | 1.4 | 0.6 | 98.6 | 1 |
| Example 3 | 99.5 | 1.6 | 0.5 | 98.4 | 0.5 |
| Example 4 | 99.3 | 1.3 | 0.7 | 98.7 | 2 |
| Example 5 | 99.1 | 0.5 | 0.9 | 99.5 | 1 |
| Example 6 | 99.2 | 0.5 | 0.8 | 99.5 | 1 |
| Comparative Example 4 | 99.2 | 0.9 | 0.8 | 99.1 | 5.7 |
| Comparative Example 5 | 99.2 | 1.3 | 0.8 | 98.7 | 0.44 |

Experimental Example 2: Cycle Characteristic Evaluation Experiments

The positive electrode active material prepared according to each of Examples 1 to 6 and Comparative Examples 1 to 5, acetylene black, and polyvinylidene fluoride (PVdF) in a weight ratio of 97:2:1 were added to N-methyl-2-pyrrolidone (NMP) as a solvent to prepare a positive electrode slurry. An aluminum (Al) thin film was coated with the positive electrode slurry in an amount of 400 mg/25 cm$^2$ and then dried, thereby manufacturing a positive electrode. The positive electrode was roll-pressed.

Natural graphite, carbon black as a conductive material, styrene-butadiene rubber, and carboxymethylcellulose (CMC) were mixed in a weight ratio of 96.3:1:1.5:1.2, thereby preparing a slurry for a negative electrode. A copper foil was coated with the negative electrode slurry in an amount of 350 mg/25 cm$^2$ and then dried in a 100° C. dry oven for 10 hours, followed by being roll-pressed. As a result, a negative electrode was manufactured.

A polyolefin separator was interposed between the positive electrode and the negative electrode, and then an electrolyte prepared by dissolving 1 M LiPF$_6$ in a solvent, which was prepared by mixing ethylene carbonate(EC) and diethyl carbonate (DEC) in a volume ratio of 30:70, was injected. As a result, a coin-shaped battery was manufactured.

The following electrochemical evaluation experiment was performed using the coin-shape battery.

In particular, the lithium secondary battery was charged at 0.2 C 4.4 V CC-CV (0.05 C cut-off) and then discharged at 0.2 C 3.0 V CC in a 25° C. chamber to activate (form) the same. Subsequently, charging at 0.7 C CC-CV/discharging at 0.5 C CC was repeatedly performed 100 times (20 minutes left).

Results are summarized in Table 2 below.

TABLE 2

| | Capacity retention rate after 100 cycles (%) | |
|---|---|---|
| | 25° C. | 45° C. |
| Example 1 | 95.3 | 94.4 |
| Example 2 | 95.7 | 93.8 |
| Example 3 | 95.4 | 93.5 |

TABLE 2-continued

| | Capacity retention rate after 100 cycles (%) | |
|---|---|---|
| | 25° C. | 45° C. |
| Example 4 | 96.4 | 94.4 |
| Example 5 | 95.9 | 94.1 |
| Example 6 | 95.1 | 94.0 |
| Comparative Example 1 | 92.6 | 91.1 |
| Comparative Example 2 | 94.2 | 92.6 |
| Comparative Example 3 | 94.0 | 91.9 |
| Comparative Example 4 | 93.9 | 92.1 |
| Comparative Example 5 | 93.2 | 91.3 |

As shown in Table 2, it can be confirmed that the lithium secondary batteries respectively including the positive electrode active materials of Examples 1 to 6 including the lithium transition metal oxide; the first doping element (A); and the second doping element (B), wherein a weight ratio (A/B ratio) of the first doping element to the second doping element is 0.5 to 5, exhibit excellent capacity retention rates after 100 cycles and thus superior long lifespan characteristics at both 25° C. and 45° C. as compared to the lithium secondary batteries respectively including the positive electrode active materials of Comparative Examples 1 to 5.

The positive electrode active material (Comparative Example 1) excluding a doping element, the positive electrode active material (Comparative Examples 2 and 3) including only one doping element, and the positive electrode active materials (Comparative Examples 4 and 5), wherein a weight ratio (A/B ratio) of the first doping element to the second doping element is outside 0.5 to 5, exhibit poor capacity retention rates after 100 cycles as compared to the positive electrode active materials of Examples 1 to 6. This result indicates that, for excellent long lifespan characteristics, both the first doping element and the second doping element should be included and a weight ratio (A/B ratio) of the first doping element to the second doping element should be within a predetermined content ratio.

Experimental Example 3: Thermal Stability Evaluation

Secondary batteries were manufactured using the positive electrode active materials of Examples 1 to 6 and Comparative Examples 1 to 5 and activated according to the method of Experimental Example 1, followed by fully charging once at 0.2 C 4.4 V CC-CV (0.05 C cut-off) to perform differential scanning calorimetry (DSC). Results are summarized in Table 3 below.

In particular, the fully charged coin-shape battery was disassembled in a dry room, and then only the positive electrode was collected. The collected positive electrode was placed in a DSC pan, and 20 μl of an electrolytic solution was injected thereinto, followed by measuring thermal stability while elevating temperature from 35° C. to 600° C. at a temperature elevation rate of 10° C./min using DSC (TGA/DSC 1, manufactured by Mettler toledo).

TABLE 3

| Battery | Main peak (° C.) |
|---|---|
| Example 1 | 255 |
| Example 2 | 254 |
| Example 3 | 252 |
| Example 4 | 254 |
| Example 5 | 251 |
| Example 6 | 253 |

TABLE 3-continued

| Battery | Main peak (° C.) |
|---|---|
| Comparative Example 1 | 242 |
| Comparative Example 2 | 246 |
| Comparative Example 3 | 247 |
| Comparative Example 4 | 248 |
| Comparative Example 5 | 250 |

Referring to Table 3, it can be confirmed that the main peak temperatures of Examples 1 to 6 are higher than those of Comparative Examples 1 to 5. This result indicates that, in the case of the secondary batteries including the positive electrode active material of the present invention, temperature increase due to heat generated when an exothermic reaction occurs in the secondary batteries due to an internal short circuit or an impact is delayed, whereby a series of exothermic reactions can be prevented.

Accordingly, it was confirmed that both the first doping element and the second doping element should be included and a weight ratio (A/B ratio) of the first doping element to the second doping element should be within the predetermined content ratio so as to exhibit excellent long lifespan characteristics and superior thermal stability.

The invention claimed is:

1. A positive electrode active material, wherein the positive electrode active material is a lithium transition metal oxide comprising a first doping element (A) and a second doping element (B),
   wherein the first doping element is Zr,
   the second doping element is one or more selected from the group consisting of Al, Ta, and Co, and
   a weight ratio (A/B ratio) of the first doping element to the second doping element is 0.5 to 2,
   wherein the lithium transition metal oxide is composed of a lithium layer and a transition metal layer, the first doping element is included in the lithium layer, and the second doping element is included in the transition metal layer, and
   the positive electrode active material is represented by Formula 1 or Formula 2 below:

  [Formula 1]

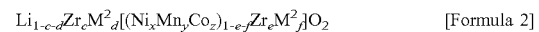  [Formula 2]

wherein 0<a<0.1, 0<b<0.1, 0<c<0.1, 0<d<0.1, 0<e<0.1, 0<f<0.1, x+y+z=1,
$M^2$ is one or more selected from the group consisting of Al, Ta, and Co.

2. The positive electrode active material according to claim 1, wherein the first doping element is included in the lithium layer and the transition metal layer in a weight ratio of 80:20 to 100:0.

3. The positive electrode active material according to claim 1, wherein the second doping element is included in the transition metal layer and the lithium layer present in a weight ratio of 80:20 to 100:0.

4. The positive electrode active material according to claim 1, wherein the first doping element is included in an amount of 500 ppm to 10,000 ppm based on a total weight of the positive electrode active material.

5. The positive electrode active material according to claim 1, wherein the second doping element is included in an amount of 100 ppm to 10,000 ppm based on a total weight of the positive electrode active material.

6. A positive electrode for lithium secondary batteries comprising the positive electrode active material according to claim 1.

7. A lithium secondary battery, comprising the positive electrode according to claim 6.

8. A method of preparing the positive electrode active material according to claim 1, the method comprising:
- a step of mixing a lithium compound, a transition metal compound, a compound comprising the first doping element (A), and a compound comprising the second doping element (B); and
- a step of sintering the mixture obtained by the aforementioned step.

9. The method according to claim 8, wherein the lithium transition metal oxide composed of a transition metal layer and a lithium layer is formed by the sintering.

10. The method according to claim 9, wherein, during the sintering, doping the lithium layer with the first doping element (A), and doping the transition metal layer with the second doping element (B).

11. The method according to claim 10, wherein doping positions of the first doping element (A) and the second doping element (B) are determined by a diffusion rate difference between the elements and effective ion radii thereof during the sintering.

* * * * *